United States Patent [19]

Kanai

[11] Patent Number: 4,995,490
[45] Date of Patent: Feb. 26, 1991

[54] ROLLER-SYNCHRONIZED ONE-WAY CLUTCH ASSEMBLY

[75] Inventor: Kenichi Kanai, Chigasaki, Japan

[73] Assignee: NSK-Warner Kabushiki Kaisha, Tokyo, Japan

[21] Appl. No.: 405,093

[22] Filed: Sep. 8, 1989

Related U.S. Application Data

[63] Continuation of Ser. No. 173,398, Mar. 25, 1988, abandoned.

[30] Foreign Application Priority Data

Mar. 25, 1987 [JP] Japan ................................. 62-69167

[51] Int. Cl.$^5$ .............................................. F16D 41/07
[52] U.S. Cl. .................................... 192/45; 192/41 R
[58] Field of Search ...................... 192/41 R, 41 A, 44, 192/45, 45.1; 188/82.84

[56] References Cited

U.S. PATENT DOCUMENTS 3,104,744 9/1963 Wade .................................... 192/45
3,876,047 4/1975 Rist ..................................... 192/45

FOREIGN PATENT DOCUMENTS 233398 2/1986 German Democratic Rep...192/41 A
2073399 10/1981 United Kingdom ................. 192/45

Primary Examiner—Leslie A. Braun
Assistant Examiner—David A. Testardi
Attorney, Agent, or Firm—Skjerven, Morrill, MacPherson, Franklin & Friel

[57] ABSTRACT

A roller-synchronized one-way clutch assembly includes a ring-shaped first retainer element, a ring-shaped second retainer element, a plurality of rollers and at least one spring extending between the first and second retainer elements. In the preferred embodiment, each of the first and second retainer elements is generally U-shaped and different in size and one of the first and second retainer elements is received in a U-shaped channel of the other. The first and second retainer elements are operatively coupled together such that they may move relative to each other in a circumferential direction over a predetermined angle. All of the rollers are movably supported by a retainer sub-assembly to provide a complete full phase function.

13 Claims, 9 Drawing Sheets

ROLLER-SYNCHRONIZED ONE-WAY CLUTCH ASSEMBLY

This application is a continuation of patent application Ser. No. 07/173,398, filed Mar. 25, 1988 now abandoned.

BACKGROUND OF THE INVENTION

1. Field of the Invention

This invention generally relates to a one-way clutch assembly to be interposed between an inner rotating member and an outer rotating member to permit a relative rotation between the inner and outer rotating members only in one direction, and in particular to a roller-synchronized one-way clutch assembly including a plurality of rollers which are synchronized in clutching operation.

2. Description of the Prior Art

A one-way clutch assembly using a plurality of rollers is well known in the art, and typical prior art examples are shown in FIGS. 1 and 2. As shown in FIG. 1, a one-way clutch assembly is interposed between a pair of outer and inner rotating members 1 and 2, which are provided concentrically to be rotatable relative to each other, for controlling the relative rotation between these outer and inner rotating members 1 and 2. In the prior art structure shown in FIG. 1, a plurality of cam surfaces, each having a predetermined shape, are formed at the outer peripheral surface of the inner rotating member 2 in the form of a recess, and a roller 3 is disposed inside of each of the cam surfaces 2a to be movable therein, and the roller 3 is normally urged in a predetermined direction by means of a spring 4. As shown in FIG. 1, the cam surface 2a is slightly inclined with respect to the radial direction, so that the roller 3 is pushed against the cam surface 2a of the inner rotating member 2 and the inner peripheral surface of the outer rotating member 1 as being urged by the spring 4. As a result, the counterclockwise rotation of the outer rotating member 1 relative to the inner rotating member 2 is prohibited, but the clockwise rotation of the outer rotating member 1 relative to the inner rotating member 2 is allowed.

In FIG. 1, the structure enclosed by the circle A illustrates the type in which the spring 4 is received in a hole formed in the inner rotating member 2 and a cap 5 is fitted onto the forward end of the spring 4; on the other hand, the structure enclosed by the circle B illustrates the type in which use is made of an accordion type spring. In addition, the prior art one-way clutch assembly shown in FIG. 2 is similar in many respects to the prior art one-way clutch assembly shown in FIG. 1; however, in the case of FIG. 2, the cam surfaces are formed not on the inner rotating member 2 but on the outer rotating member 1. In the case of the one-way clutch assembly shown in FIG. 2, the counterclockwise rotation of the outer rotating member 1 relative to the inner rotating member 2 is permitted, but the clockwise rotation of the outer rotating member 1 relative to the inner rotating member 2 is prohibited.

The roller type one-way clutch as described above is relatively simple in structure and the relative rotation between the outer and inner rotating members 1 and 2 may be controlled. However, various components such as rollers 3 and springs 4 are separately provided and it is rather difficult to assemble. Besides, difficulties are also encountered in repair and maintenance. Moreover, when it is required to form holes in either of the outer and inner rotating members 1 and 2 as illustrated by the structure enclosed by the circle A, its processing is rather difficult, which tends to push up the cost. In addition, in the assembled condition, each of the rollers 3 is independent in operation in principle, so that the performance tends to be irregular in the circumferential direction. As a result, the overall operation tends to be unstable and lacks reliability.

The U.S. Pat. No. 3,166,169 issued to Wade et al. discloses a one-way roller clutch with plural cage means in which all of the rollers are synchronized in clutching operation. However, Wade et al. teaches to provide a plurality of springs same in number as the rollers with each spring having one end in contact with the associated roller. With this structure, difficulty will be encountered in assemblage and also the performance may differ from roller to roller. As a result, the overall operation of the clutch assembly may not be uniform in the circumferential direction.

SUMMARY OF THE INVENTION

In accordance with the present invention, there is provided a roller-synchronized one-way clutch assembly which includes a ring-shaped first retainer element, a ring-shaped second retainer element which is coupled to the first retainer element so as to be movable over a predetermined angle relative to each other, a plurality of rollers rotatably supported by at least one of said first and second retainer elements, and urging means coupled between said first and second retainer means so as to normally urge one of said first and second retainer elements in a predetermined rotational direction with respect to the other. In the preferred embodiment, each of the first and second retainer elements has a U-shaped cross section in the radial direction and one of the first and second retainer elements is received within the space defined by the other.

It is therefore a primary object of the present invention to obviate the disadvantages of the prior art as described above and to provide an improved one-way clutch assembly.

Another object of the present invention is to provide an improved roller-synchronized one-way clutch assembly easy to manufacture, simple in maintenance and low at cost.

A further object of the present invention is to provide an improved roller-synchronized one-way clutch assembly reliable and stable in operation and uniform in performance in the circumferential direction.

A still further object of the present invention is to provide an improved roller-synchronized one-way clutch assembly having a high load torque bearing capability.

Other objects, advantages and novel features of the present invention will become apparent from the following detailed description of the invention when considered in conjunction with the accompanying drawings.

DESCRIPTION OF THE PREFERRED EMBODIMENTS

Figure 3:
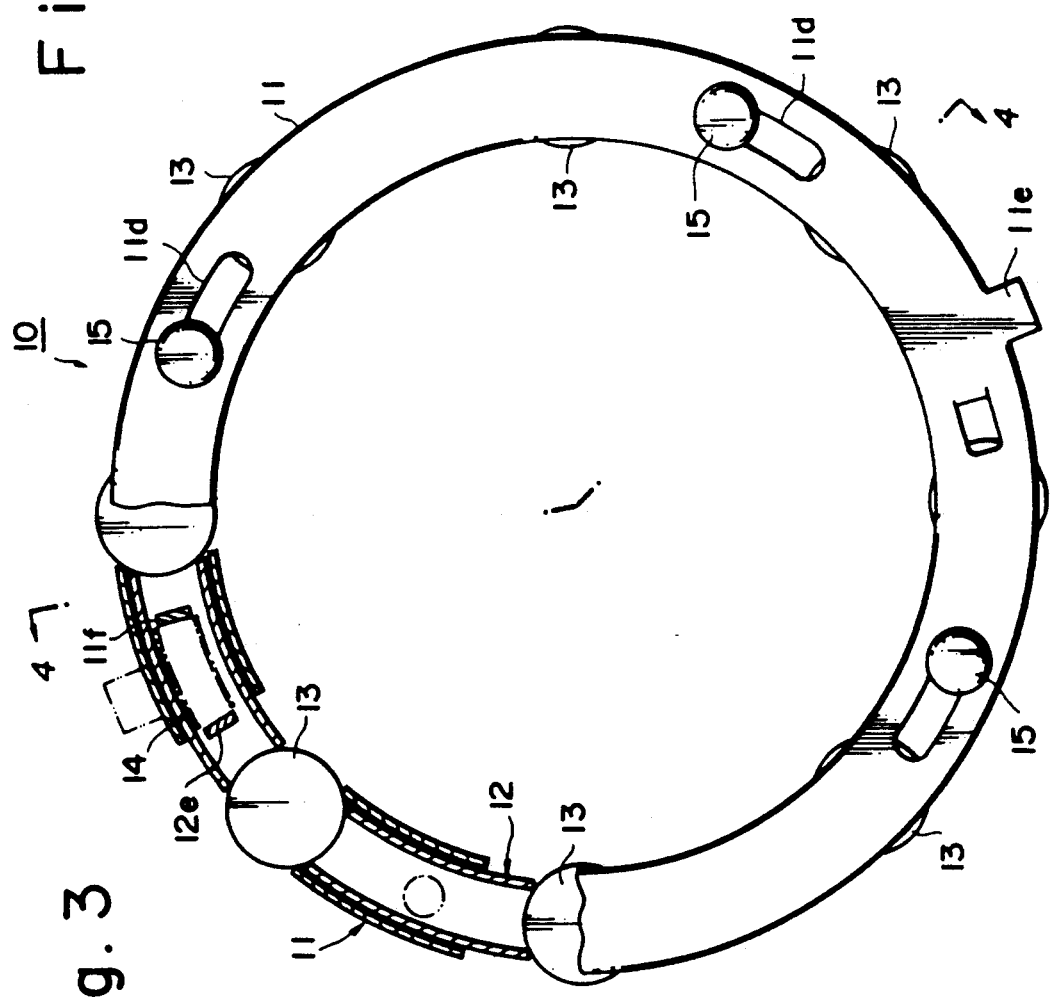
FIG. 3 is a partially cut-away schematic illustration showing the overall structure of a roller-synchronized one-way clutch assembly constructed in accordance with one embodiment of the present invention.

Referring now to FIG. 3, there is schematically shown a roller-synchronized one-way clutch assembly 10 constructed in accordance with one embodiment of the present invention. As shown, the present clutch assembly 10 generally has a cage-and-roller type structure and it includes a retainer assembly comprised of a pair of ring-shaped elements namely a first retainer element 11 and a second retainer element 12, a plurality of rollers 13 and at least one spring 14 extended between the first and second retainer elements 11 and 12. The ring-shaped retainer assembly 11-12 is formed with a pair of windows at its inner wall and outer wall at a plurality of locations in the circumferential direction, and a -roller 13 is disposed at each of these locations as partly extending outwardly through the windows on both sides. In the illustrated embodiment, the plurality of rollers 13 are arranged as spaced apart from one another at a predetermined pitch at equal angular intervals in the circumferential direction. The size of each of the windows is set to be slightly smaller than the maximum diameter of the roller 13 so that each of the rollers 13 is retained in its intended position as rotatable therein.

Figure 1:
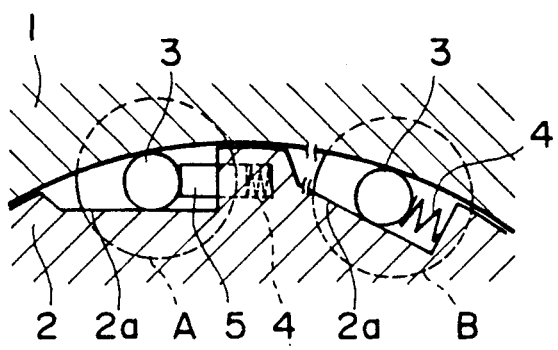
FIGS. 1 and 2 are schematic illustrations showing typical prior art one-way roller clutch assemblies.
Figure 2:
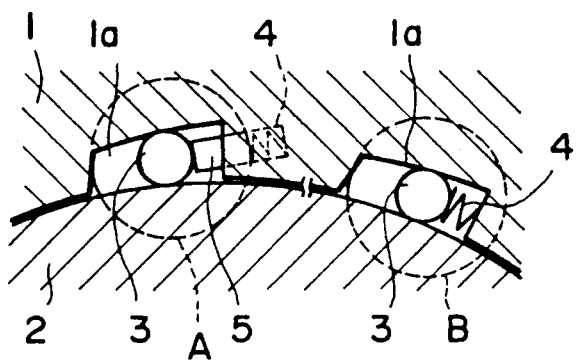
Figure 4:
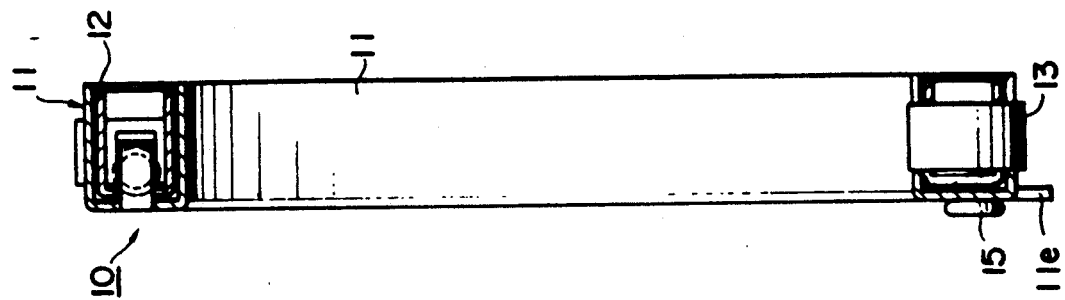
FIG. 4 is a cross-sectional view taken along line 4—4 indicated in FIG. 3.

FIG. 4 is a schematic cross-sectional view taken along line 4—4 indicated in FIG. 3. As is clear from FIG. 4, in the illustrated embodiment, both of the first and second retainer elements 11 and 12 have a generally U-shaped cross-sectional shape when taken in the transverse or radial direction, and the width of the second retainer element 12 is set to be smaller than the width of the first retainer element 11, so that the second retainer element 12 is received within the first retainer element 11 with a predetermined gap therebetween. That is, both of the first and second retainer elements 11 and 12 are generally annular in shape with one side opened and the second retainer element 12 is fitted in the space defined by the first retainer element 11. The first and second retainer elements 11 and 12 are assembled such that both of them can move relative to each other over a predetermined angle in the circumferential direction. That is, as is obvious from FIG. 3, the first retainer element 11 is formed with a plurality of slots 11d extending in the circumferential direction at a plurality of appropriate positions in the circumferential direction; on the other hand, the second retainer element 12 is formed with a like plurality of connection pins 15 each of which extends in the axial direction and extends through the corresponding one of the slots 11d. Thus, the first and second retainer elements 11 and 12 are allowed to move relative to each other in the circumferential direction over an angle determined by the engagement of the connection pin 15 with both ends of the corresponding slot 11d. In the illustrated embodiment, an enlarged portion having a size larger than the width of the slot 11d is formed at the head of the connection pin 15 so that the first and second retainer elements 11 and 12 do not fall apart undesirably once assembled together.

Furthermore, a portion of the first retainer element 11 is cut and bent to define a first stopper 11f; on the other hand, a portion of the second retainer element 12 is cut and bent to define a second stopper 12e. These first and second stoppers 11f and 12e are located at the same radial position and thus oppose each other in the circumferential direction. A spring 14 is extended between this pair of first and second stoppers 11f and 12e, so that the first and second retainer elements 11 and 12 are urged to move in the opposite directions in the circumferential direction. In this case, the first retainer element 11 is forced to move in a predetermined urging direction relative to the second retainer element 12 until the connection pin 15 comes into abutment against one end of the associated slot 11d. That is, the first and second retainer elements 11 and 12 are movable relative to each other over an angle which is determined by the length of the slot 11d in the circumferential direction.

In the illustrated embodiment, the first retainer element 11 is formed with a pair of detent projections 11e which extend radially outwardly. These detent projections 11e are to be fitted into detent holes formed in an outer rotating member 1 when the present one-way clutch assembly 10 is assembled between an outer rotating member 1 and an inner rotating member 2 as will be described and shown later, whereby the first retainer element 11 is integrated with the outer rotating member 1 as far as rotational motion is concerned. It is to be noted that such detent projections 11e may also be formed as extending radially inwardly, if desired. In this case, however, the first retainer element 11 is integrated with the inner rotating member 2. It should further be noted that such detent projections 11e may also be formed on the second retainer element 12 instead of the first retainer element 11. The first and second retainer elements 11 and 12 may be formed from any desired material, such as a metal or a synthetic resin.

Figure 5:
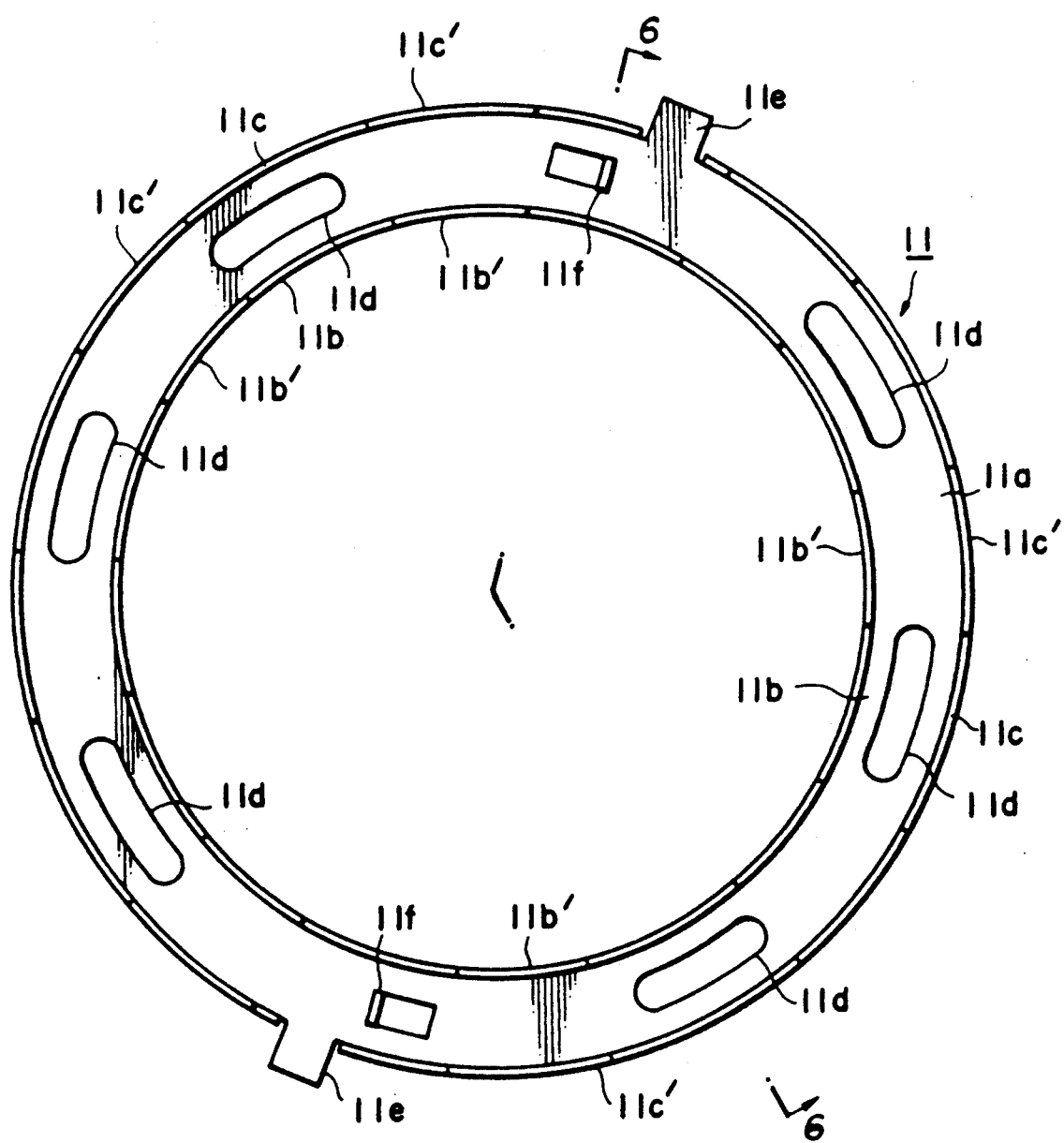
FIG. 5 is a schematic illustration showing the overall structure of a ring-shaped first retainer element 11 provided in the clutch assembly shown in FIG. 3.
Figure 6:
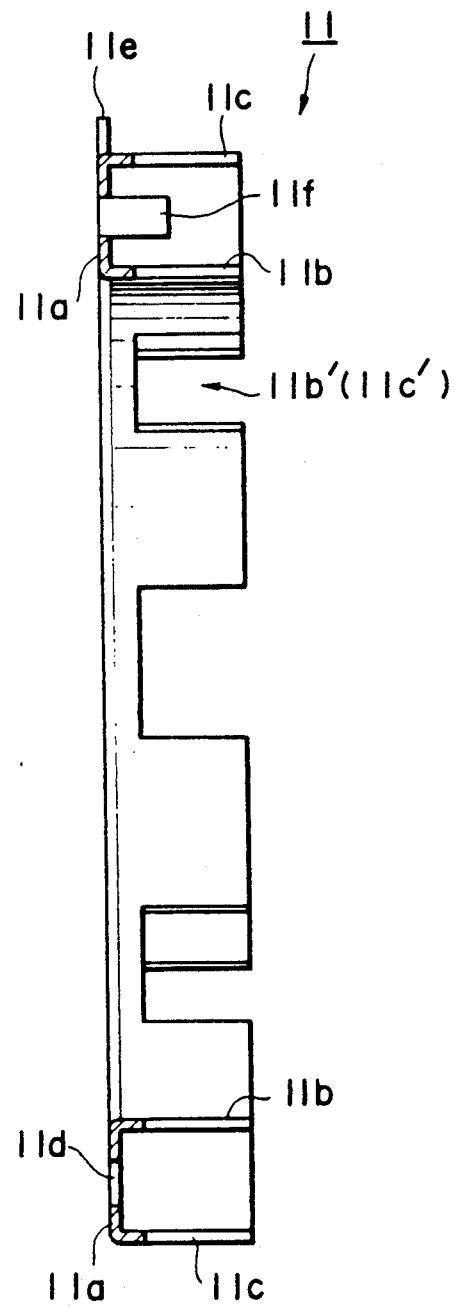
FIG. 6 is a side elevational view of the first retainer element 11.
Figure 7:
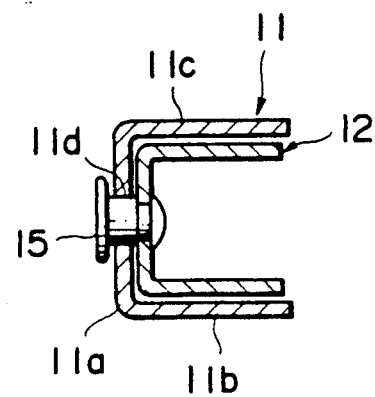
FIG. 7 is a schematic transverse cross-sectional view showing the positional relationship between the first retainer element 11 and a second retainer element 12 in an assembled state.
Figure 8:
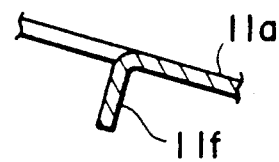
FIG. 8 is a partial cross-sectional view of the first retainer element 11 shown in FIG. 5.

FIG. 5 schematically illustrates in plan view the overall structure of the first retainer element 11 employed in the present roller-synchronized one-way clutch assembly shown in FIGS. 3 and 4. FIG. 6 is a cross-sectional view of the first retainer element 11 taken along line 6—6 indicated in FIG. 5. FIG. 7 is a transverse cross-sectional view showing part of the first retainer element 11 and FIG. 8 is its partial cross-sectional view. As is obvious from these figures, the first retainer element 11 includes a generally ring-shaped bottom wall 11a, an inner side wall 11b extending along the inner edge of the bottom wall 11a, and an outer side wall 11c extending along the outer edge of the bottom wall 11a. These bottom wall 11a, inner side wall 11b and outer side wall 11c define a generally U-shaped annular channel. Both of the inner and outer side walls 11b and 11c are formed with a plurality of cut-away portions 11b' and 11c', respectively, at a plurality of locations, which extend to the vicinity of the bottom wall 11a.

As shown in FIG. 5, the bottom wall 11a of the first retainer element 11 is formed with a plurality of slots 11d as spaced apart from one another in the circumferential direction. In addition, as shown in FIG. 8, predetermined portions of the bottom wall 11a are cut and bent to define first stoppers 11f. In the illustrated embodiment, a pair of such first stoppers 11f and 11f is provided at positions 180° spaced apart from each other. As will be made clear later, each of these first stoppers 11f serves to hold one end of a spring 14. On other hand, as shown in FIG. 7, the U-shaped second retainer element 12 is received within the U-shaped first retainer element 11, and each of the connection pins 15, which are fixedly attached to the bottom wall of the second retainer element 12 by caulking, extends through the corresponding slot 11d formed in the bottom wall 11a of the outer first retainer element 11, and the head portion of the connection pin 15 is formed to be larger in size than the width of the slot 11d. Besides, a pair of detent projections 11e and 11e is formed as extending radially outwardly from the bottom wall of the first retainer element 11, and in the illustrated embodiment, a pair of such detent projections 11e and 11e are separated away from each other over 180°. As will be made clear later, these detent projections 11e are fitted into respective detent holes formed in the outer rotating member 1 when the present clutch assembly 10 is assembled between the outer and inner rotating members 1 and 2.

Figure 9:
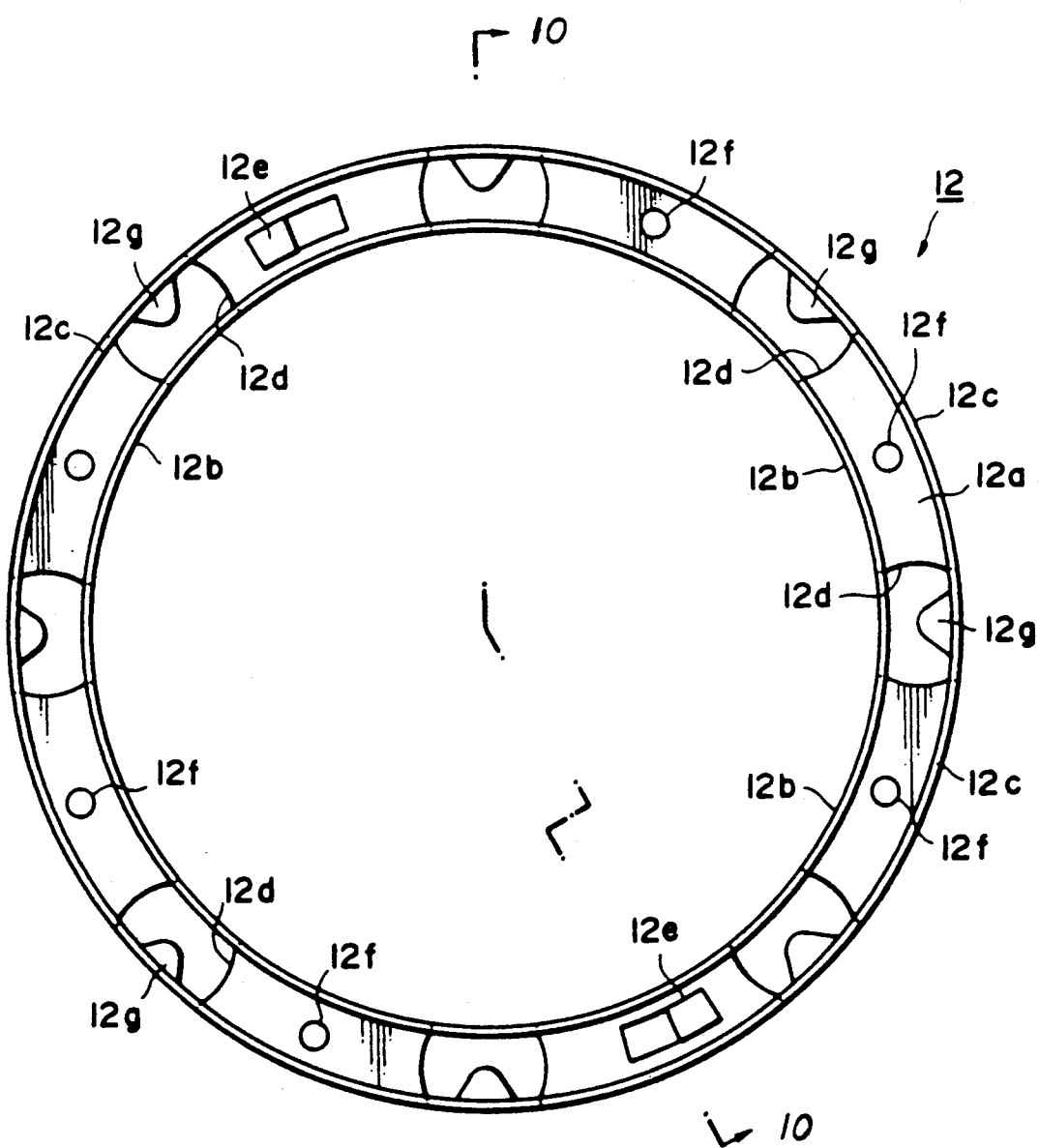
FIG. 9 is a schematic illustration showing the overall structure of the second retainer element 12 provided in the clutch assembly shown in FIG. 3.
Figure 10:
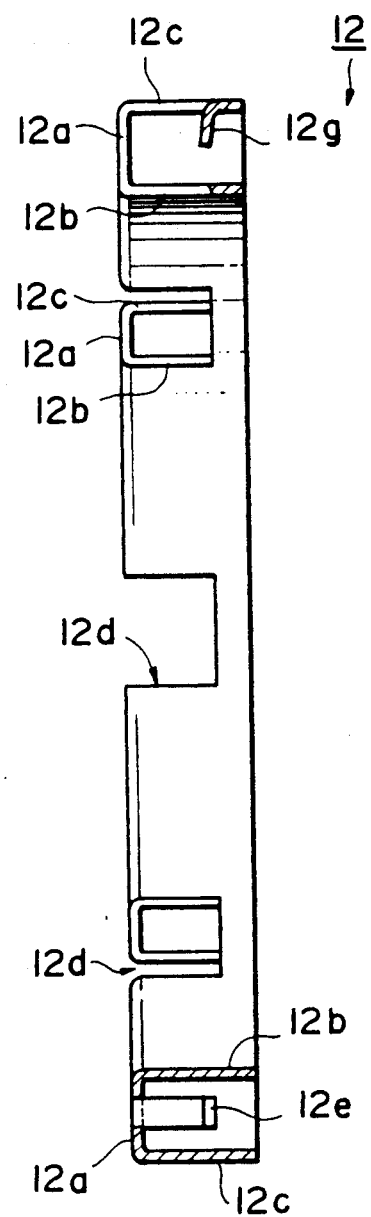
FIG. 10 is a side elevational view, taken on the line 10—10 of FIG. 9, of the second retainer element 12.
Figure 11:
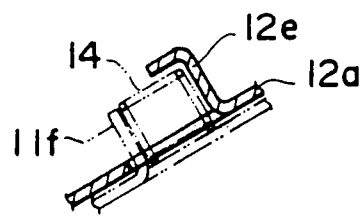
FIG. 11 is a partial cross-sectional view of the second retainer element 12.

FIG. 9 schematically illustrates in plan view the overall structure of the second retainer element 12 employed in the present roller-synchronized one-way clutch assembly shown in FIG. 3. FIG. 10 is a side elevational view of the second retainer element 12 and FIG. 11 is its partial cross-sectional view. As is obvious from FIG. 9, the second retainer element 12 also includes a generally ring-shaped bottom wall 12a, an inner side wall 12b extending along the inner edge of the bottom wall 12a, and an outer side wall 12c extending along the outer edge of the bottom wall 12a. A plurality of cut-away portions 12d are formed as spaced apart from one another in the circumferential direction by removing portions of the bottom wall 12a and inner and outer walls 12b and 12c of the second retainer element 12. In each of the cut-away portions 12d, a portion of the outer side wall 12c is bent inwardly to thereby define a roller holding projection 12g. That is, in an assembled state, each roller 13 is located within the corresponding cut-away portion 12d, whereby the roller 13 is maintained in its intended location with its one flat end surface regulated by this roller holding projection 12g.

The bottom wall 12a of the second retainer element 12 is formed with a plurality of pin holding holes 12f as spaced apart from one another in the circumferential direction. One end of a connection pin 15 may be fitted into the corresponding hole 12f and its bottom end may be fixed to the bottom wall 12a, for example, by caulking. In addition, the bottom wall 12a of the second retainer element 12 is formed with a pair of second stoppers 12e as spaced apart from each other over 180°. These second stoppers 12e are formed by cutting predetermined portions of the bottom wall 12a of the second retainer element 12 and bent as indicated in FIG. 11. In an assembled state, each of these second stoppers 12e serves to hold the other end of the spring 14 whose one end is held by the corresponding first stopper 11f of the first retainer element 11. In the illustrated embodiment, an opening is formed in the bottom wall 12a by cutting a portion of the bottom wall 12a and bending the cut portion to define the second stopper 12e and the first stopper 11f of the first retainer element 11 extends through the opening of the bottom wall 12a so that the stoppers 11f and 12e are located opposite to each other in the circumferential direction in an assembled state.

Figure 12:
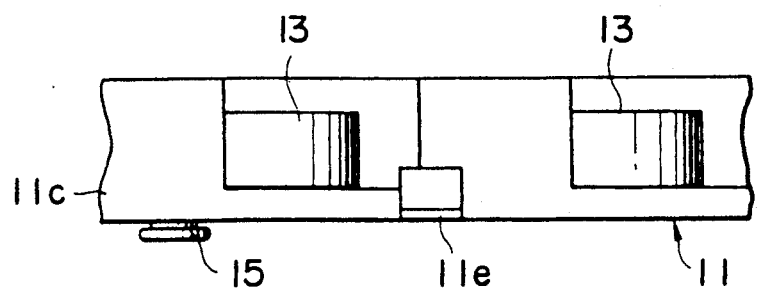
FIG. 12 is a partial side elevational view of the second retainer element 12.
Figure 13A:
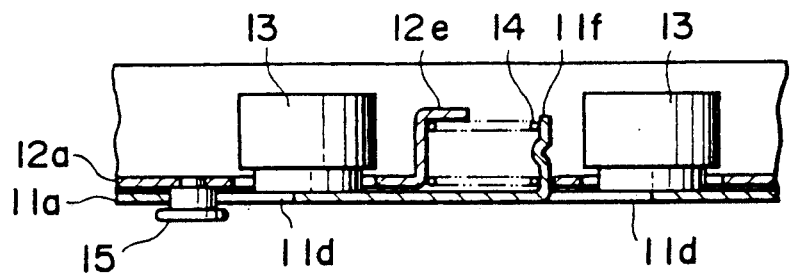
FIGS. 13a, 13b, 14a and 14b are schematic illustrations which are useful for understanding the operation of the present clutch assembly 10.

FIG. 12 is a partial side elevational view of the present roller-synchronized one-way clutch assembly shown in FIG. 3 and a portion of the first retainer element 11 and a pair of rollers 13 and 13 are illustrated. FIG. 13a illustrates the condition when the outer side wall 11c of the first retainer element 11 has been removed in the structure of FIG. 12 and FIG. 12b is a partial front view thereof. As is obvious from FIG. 13a, a pair of first and second stoppers 11f and 12e are located opposite to each other in the circumferential direction and a spring 14 is provided to extend between the stoppers 11f and 12e. Thus, the first and second stoppers 11e and 12e are urged to move away from each other in the circumferential direction by the force of the spring 14 sandwiched therebetween. As a result, the first and second retainer elements 11 and 12 are normally urged to move relative to each other in the opposite directions in the circumferential direction. In the illustrated embodiment, the rollers 13 are supported by the second retainer element 12 and the first retainer element 11 is operatively coupled to the second retainer element 12 to be movable relative to the second retainer element 12 in the circumferential direction over a predetermined angle. In addition, the first retainer element 11 is fixedly attached to the outer rotating member 1 through its detent projections 11e.

Figure 13B:
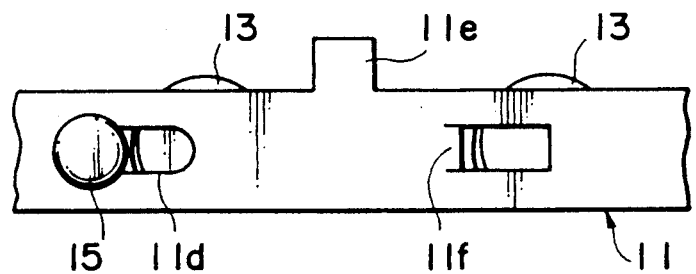
Figure 14A:
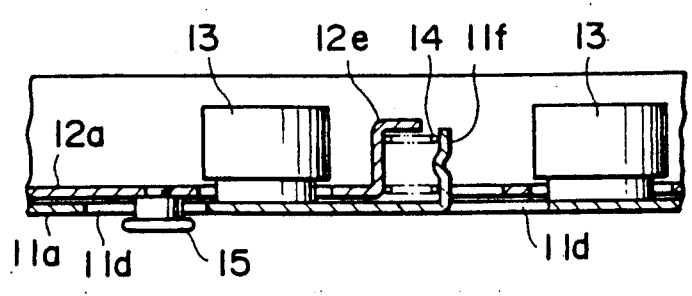
Figure 14B:
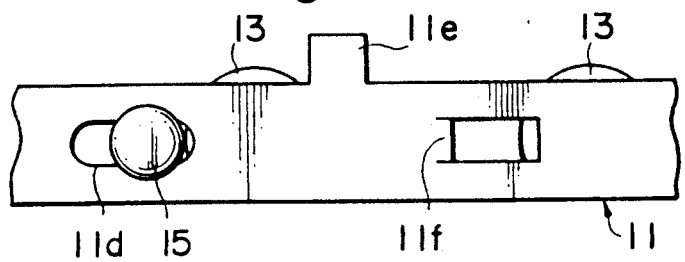

FIGS. 13a and 13b illustrate the condition in which the second retainer element 12 has been moved relative to the first retainer element 11 in the circumferential direction due to the force of the spring 14 until the connection pin 15 fixedly attached to the second retainer element 12 has come into abutment against the left-hand end of the slot 11d formed in the first retainer element 11. On the other hand, FIGS. 14a and 14b illustrate the condition in which the second retainer element 12 has been moved relative to the first retainer element 11 in the circumferential direction against the force of the spring 14 until the connection pin 15 has been located closer to the right-hand end of the slot 11d of the first retainer element 11. In this manner, through the relative movement between the first and second retainer elements 11 and 12 in the circumferential direction, the rollers 13 supported by the second retainer element 12 change their relative positional relationships with the first retainer element 11 in the circumferential direction. That is, in the condition shown in FIG. 13b, the detent projection 11e of the first retainer element 11 is located approximately at a midpoint between the two rollers 13 and 13; whereas, in the condition shown in FIG. 14b, the detent projection 11e is located closer to the left-hand roller 13.

Figure 15:
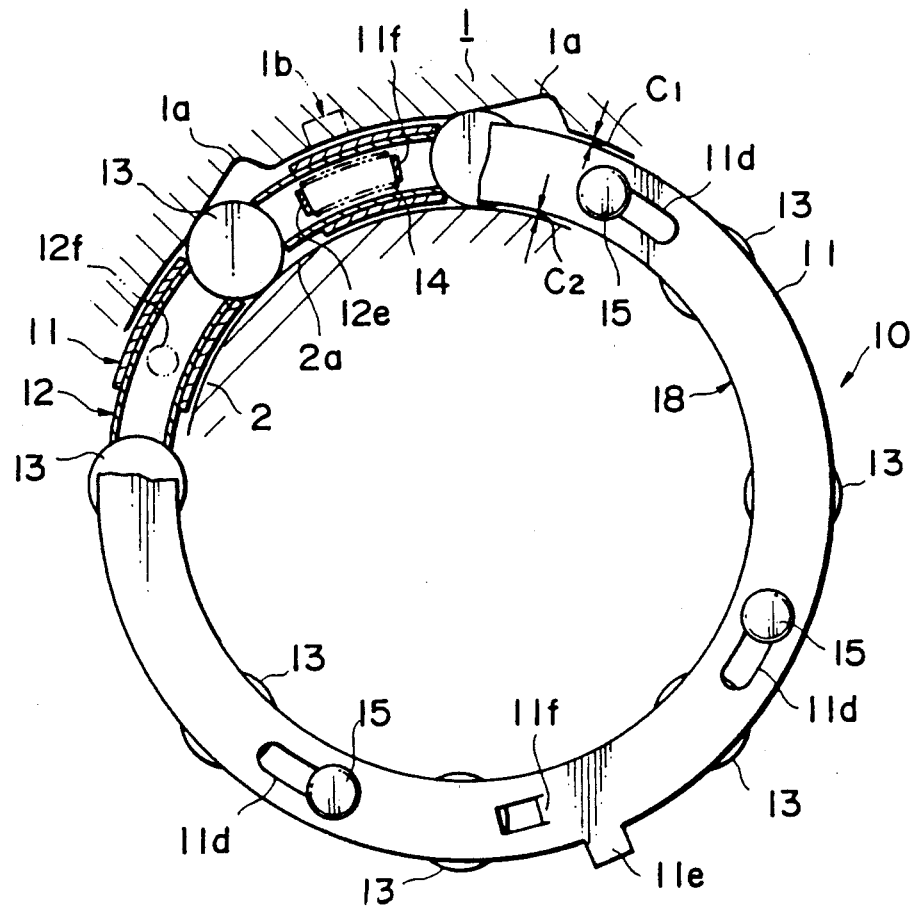
FIG. 15 is a schematic illustration showing the condition when the present clutch assembly 10 is assembled between an outer rotating member 1 and an inner rotating member 2.

FIG. 15 illustrates the condition in which the present roller-synchronized one-way clutch assembly 10 is assembled between an outer rotating member 1 and an inner rotating member 2. In the illustrated embodiment, the outer rotating member 1 is formed with a plurality of cam surfaces 1a. The outer rotating member 1 is also formed with a pair of detent holes 1b each of which receives therein the corresponding detent projection 11e of the first retainer element 11. Thus, in the illustrated structure, the first retainer element 11 is integrated with the outer rotating member 1 as far as the rotational motion is concerned, and in this sense the first retainer element 11 is fixedly attached to the outer rotating member 1. The outer rotating member 1 is formed with a plurality of inclined cam surfaces 1a each corresponding to each of the rollers 13 of the clutch assembly 10, and each of the cam surfaces 1a is inclined radially inwardly in the counterclockwise direction to thereby define a wedge-shaped or convergent space. In the illustrated structure, since the inner rotating member 2 rotates relative to the clutch assembly 10 and also to the outer rotating member 1, the inner peripheral surface 18 of the retainer assembly 11-12 of the present clutch assembly 10 serves as a bearing. In the case where the inner peripheral surface 18 of the retainer assembly 11-12 serves as a bearing, an appropriate lubrication gap may be provided to the inner peripheral surface 18. However, in order to provide an enhanced bearing function, a layer comprised of a material having a bearing capability may be formed on the inner peripheral surface of the first retainer element 11. Such a bearing layer may be formed, for example, by depositing a bimetal material by surface processing. Alternatively, the first retainer element 11 as a whole may be formed from such a bearing material, or one or more predetermined portions of the first retainer element 11 may be formed from such a particular bearing material.

In the present embodiment, when the inner rotating member 2 tries to rotate in the counterclockwise direction relative to the outer rotating member 1, its rotation is prohibited; on the other hand, the clockwise rotation of the inner rotating member relative to the outer rotating member 1 is allowed to take place. As a result, the present clutch assembly 10 serves to allow the outer and inner rotating members 1 and 2 to rotate relative to each other only in one direction. In this case, in the present clutch assembly 10, all of the rollers 13 are supported by the retainer assembly 11-12, in particular by the second retainer element 12, and the retainer assembly 11-12, in particular the first retainer element 11 is integrated with the outer rotating member 1 through the detent projections 11e, so that all of the rollers 13 are synchronized in operation (so-called full phasing), and thus a uniform clutching operation in the circumferential direction can be obtained with great stability and smoothness. In the illustrated structure, clearances C1 and C2 are set between the present clutch assembly 10 and each of the outer and inner rotating members 1 and 2, respectively. It is to be noted that the inner and outer side walls of the first retainer element 11 may be used as bearings, so that a centering effect of each of the cam surface 1a of the outer rotating member 1 and a circumferential race surface 2a of the inner rotating member 2 can be obtained.

Figure 16A:
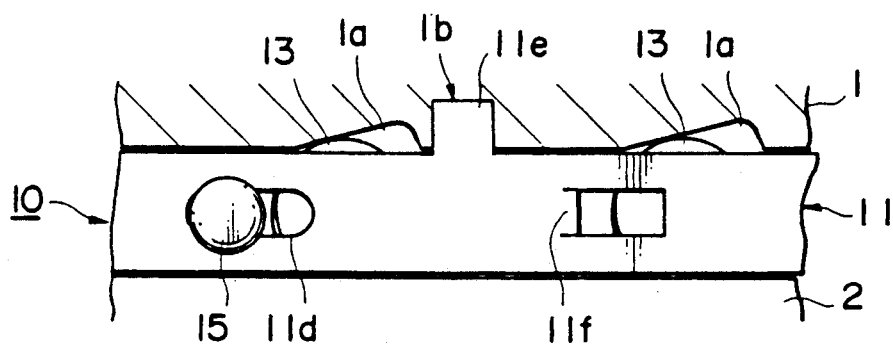
FIGS. 16a and 16b are schematic illustrations which are useful for understanding the operation of the structure shown in FIG. 15.
Figure 16B:
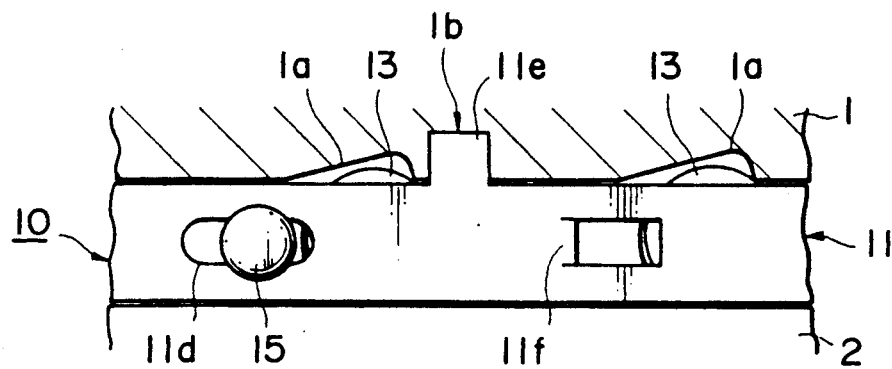

Next, with particular reference to FIGS. 16a and 16b, the operation of the structure shown in FIG. 15 will be described. As shown in FIG. 16a, the first retainer element 11 is fixedly attached to the outer rotating member 1 through the detent projections 11e, and the second retainer element 12 is located at the left end limit position (i.e., retracted position where the connection pin 15 is in abutment against the left-hand end of the slot 11d) relative to the outer rotating member 1 under the force of the spring 14. Since the rollers 13 are supported by the second retainer element 12, all of the rollers 13 are located at the narrow ends of the cam surfaces 1a under the condition, whereby the rollers 13 are tightly held between the outer and inner rotating members 1 and 2. Thus, under this condition, as shown in FIG. 15, when the inner rotating member 2 tries to rotate counterclockwise relative to the outer rotating member 1, since the inner and outer rotating members 1 and 2 are now temporarily integrated through the rollers 13 as far as rotational motion is concerned, the rotational force is transmitted to the outer rotating member 1 through the rollers 13, so that the outer rotating member 1 also rotates counterclockwise in unison.

As described previously, when the first and second retainer elements 11 and 12 are assembled together, both of them are integrated in structure, for example, by affixation of the connection pins 15 and the rollers 13 are also integrally supported in predetermined locations. Accordingly, the retainer assembly 11-12 has an integrated structure which also contains a plurality of rollers 13, and thus handling of such an assembly is extremely easy. In particular, assembling the entire structure between the outer and inner rotating members 1 and 2 is greatly facilitated and maintenance operation is also eased greatly. Thus, when such a one-way clutch assembly 10 is mounted between the outer and inner rotating members 1 and 2 as shown in FIG. 15, the first retainer element 11 is fixedly attached to the outer rotating member 1 through its detent projections 11e so that when the second retainer element 12 is moved over a predetermined angle in the counterclockwise direction under the force of the spring 14, all of the rollers 13 are pushed between the outer and inner rotating members 1 and 2 (see FIG. 16a).

On the other hand, in the case when the inner rotating member 2 rotates in the clockwise direction relative to the outer rotating member 1, the first retainer element 11 maintains its original position since it is fixedly attached to the outer rotating member 1; however, the second retainer element 12 rotates in the clockwise direction to some extent against the force of the spring 14, whereby all of the rollers 13 are synchronously moved in the clockwise direction all at the same time. In this case, since each of the rollers 13 moves toward the wider end of the inclined cam surface 1a, the roller 13 tends to move away from the cam surface 1a and also from the outer rotating member 1 so that the constraint between the outer and inner rotating members 1 and 2 through the rollers 13 is released. As a result, the inner rotating member 2 may freely rotate in the clockwise direction relative to the outer rotating member 1. FIG. 16b illustrates the condition in which the second retainer element 12 has moved to its limit in the clockwise direction relative to the first retainer element 11, in which the connection pin 15 is located at its advanced position which is closer to the right-hand end of the slot 11d. As described above, in the present clutch assembly 10, all of the rollers 13 move in the same manner and at the same time with respect to the cam surfaces 1a. Thus, under any load condition, all of the rollers 13 behave in the same manner at the same time to thereby provide a complete full phasing operation.

As described above in detail, in accordance with the present invention, since all of the components are integrated in one unit, its handling is easy and in particular an assembling or disassembling process is greatly facilitated. Since the rollers are movably supported by the retainer assembly, a synchronized (full phasing) operation is provided so that the clutching performance is uniform in the circumferential direction and it also allows to bear a higher load torque. Since the number of springs may be reduced and the shape of a spring required may be simple, there is provided a reduction in cost, which also contributes to lower the cost of the entire one-way clutch assembly Since the springs are not in direct contact with the associated rollers, the springs are not worn, deformed or damaged by the rollers and the springs may be used for a longer period of time, which also contributes to prolong the life of the one-way clutch assembly as a whole. In addition, the springs required in the present invention are very simple in structure, they may be designed very simply and freely and, for example, their drag torque may be set with ease. Thus, an optimal drag torque may be selected for each of specific applications, and thus the reliability in operation of one-way clutch assembly can be enhanced significantly. Besides, at least one of the inner and outer peripheral surfaces of the retainer assembly may be used as a bearing surface, in which case the necessity to provide a separate bearing can be eliminated.

While the above provides a full and complete disclosure of the preferred embodiments of the present invention, various modifications, alternate constructions and equivalents may be employed without departing from the true spirit and scope of the invention. For example, in the above-described embodiment, the outer rotating member was provided with cam surfaces However, the present invention may also be applied to the case in which cam surfaces are provided in the inner rotating member. In addition, the number and shape of a detent projection may be determined at will depending on specific applications. Besides, any type of springs may be used other than coil springs used in the above-described embodiment, and use may also be made of any material having elasticity, such as rubber, in place of springs, if desired. Therefore, the above description and illustration should not be construed as limiting the scope of the invention, which is defined by the appended claims.

What is claimed is:

1. A roller-synchronized one-way clutch assembly, comprising:
   a ring-shaped first retainer element;
   a ring-shaped second retainer element operatively coupled to said first retainer element to thereby define a retainer sub-assembly such that said second retainer element may move relative to said first retainer element in a circumferential direction over a predetermined range;
   a plurality of rollers supported by said retainer sub-assembly and arranged spaced apart from one another in a circumferential direction; and
   urging means having a first end connected to said first retainer element and a second end connected to said second retainer element for normally urging said first and second retainer elements to move in opposite directions in the circumferential direction, said urging means being located substantially in a circumference defined by said plurality of rollers and wherein said urging means comprises a pair of discrete springs, each spring being disposed between a pair of adjacent ones of said plurality of rollers.

2. The assembly of claim 1 wherein at least one of said first and second retainer elements is provided with at least one projection.

3. The assembly of claim 2 wherein each of said plurality of rollers has a diameter which is larger than a width of said retainer sub-assembly in the radial direction and thus each of said plurality of rollers partly projects beyond each of inner and outer walls of said retainer sub-assembly.

4. The assembly of claim 2 wherein said projection extends in the radial direction from an inner or outer end of said retainer sub-assembly.

5. The assembly of claim 1 wherein each of said first and second retainer elements has a generally U-shaped cross section in a radial direction and one of said first and second retainer elements is received in a U-shaped space defined by the other.

6. The assembly of claim 1 wherein said urging means includes a spring which extends between a first stopper formed in said first retainer element and second stopper formed in said second retainer element 7. The assembly of claim 1 wherein either one of said first and second retainer elements is formed with at least one slot extending in a circumferential direction with the other being formed with at least one connection pin, whereby said connection pin is received in said slot to thereby operatively couple said first and second retainer elements.

8. The assembly of claim 7 wherein said connection pin has a head which is larger in size than the width of said slot to thereby prevent said first and second retainer elements from falling apart.

9. A roller-synchronized one-way clutch assembly, comprising:
   a ring-shaped first retainer element;
   a ring-shaped second retainer element operatively coupled to said first retainer element to thereby define a retainer sub-assembly such that said second retainer element may move relative to said first retainer element in a circumferential direction over a predetermined range;
   a plurality of rollers supported by said retainer sub-assembly and arranged spaced apart from one another in a circumferential direction;
   urging means having a first end connected to said first retainer element and a second end connected to said second retainer element for normally urging said first and second retainer elements to move in opposite directions in the circumferential direction; and
   wherein each of said first and second retainer elements has a generally U-shaped cross section in a radial direction and one of said first and second retainer elements is received in a U-shaped space defined by the other.

10. A roller-synchronized one-way clutch assembly, comprising:
   a ring-shaped first retainer element;
   a ring-shaped second retainer element operatively coupled to said first retainer element to thereby define a retainer sub-assembly such that said second retainer element may move relative to said first retainer element in a circumferential direction over a predetermined range;

a plurality of rollers supported by said retainer sub-assembly and arranged spaced apart from one another in a circumferential direction;

urging means having a first end connected to said first retainer element and a second end connected to said second retainer element for normally urging said first and second retainer elements to move in opposite directions in the circumferential direction;

wherein either one of said first and second retainer elements is formed with at least one slot extending in a circumferential direction with the other being formed with at least one connection pin, whereby said connection pin is received in said slot to thereby operatively couple said first and second retainer elements; and wherein said connection pin has a head which is larger in size that the width of said slot to thereby prevent said first and second retainer elements from falling apart.

11. A roller-synchronized one-way clutch assembly, comprising:

a ring-shaped first retainer element;

a ring-shaped second retainer element operatively coupled to said first retainer element to thereby define a retainer sub-assembly such that said second retainer element may move relative to said first retainer element in a circumferential direction over a predetermined range;

a plurality of rollers supported by said retainer sub-assembly and arranged spaced apart from one another in a circumferential direction; and urging means having a first end connected to said first retainer element and a second end connected to said second retainer element for normally urging said first and second retainer elements to move in opposite directions in the circumferential direction, said urging means being located substantially in a circumference defined by said plurality of rollers and wherein each of said first and second retainer elements has a generally U-shaped cross section in a radial direction and one of said first and second retainer elements is received in a U-shaped space defined by the other.

12. A roller-synchronized one-way clutch assembly, comprising:

a ring-shaped first retainer element;

a ring-shaped second retainer element operatively coupled to said first retainer element to thereby define a retainer sub-assembly such that said second retainer element may move relative to said first retainer element in a circumferential direction over a predetermined range;

a plurality of rollers supported by said retainer sub-assembly and arranged spaced apart from one another in a circumferential direction; and urging means having a first end connected to said first retainer element and a second end connected to said second retainer element for normally urging said first and second retainer elements to move in opposite directions in the circumferential direction, said urging means being located substantially in a circumference defined by said plurality of rollers and wherein either one of said first and second retainer elements is formed with at least one slot extending in a circumferential direction with the other being formed with at least one connection pin, whereby said connection pin is received in said slot to thereby operatively couple said first and second retainer elements.

13. The assembly of claim 12 wherein said connection pin has a head which is larger in size that the width of said slot to thereby prevent said first and second retainer elements from falling apart.

* * * * *